Jan. 15, 1952　　　R. L. CONGDON　　　2,582,769
SEISMOMETER

Filed June 24, 1948　　　　　　　　　2 SHEETS—SHEET 1

Inventor
Richard L. Congdon
By Stevens, Davis, Miller and Mosher
Attorneys

Jan. 15, 1952  R. L. CONGDON  2,582,769
SEISMOMETER
Filed June 24, 1948  2 SHEETS—SHEET 2

Inventor
Richard L. Congdon
By Stevens, Davis, Miller and Mosher
Attorneys

Patented Jan. 15, 1952

2,582,769

UNITED STATES PATENT OFFICE 2,582,769

SEISMOMETER

Richard L. Congdon, Dallas, Tex., assignor to General Instruments Inc., a corporation of Delaware Application June 24, 1948, Serial No. 35,001

2 Claims. (Cl. 177—352)

This invention relates to seismometers for geophysical prospecting and more particularly to a highly sensitive seismometer which is especially light in weight and especially rugged in construction.

The purpose of a seismometer is to convert vibrations of the earth to electrical signals and it is common, for this purpose, to suspend a mass and a coil of wire by means of a spring and arrange for a magnetic field to surround the coil of wire and be moved by the movements of the earth so as to induce currents in the wire coil.

The device of this invention operates on this same general principle and, therefore, has a general similarity to many previously designed seismometers. However, by reason of its unique features, it is far lighter in weight than most seismometers of comparable sensitivity, and it is also far more rugged than most seismometers of comparable sensitivity. One of the important features of this new seismometer is the arrangement of the magnetic material which supplies the magnetic field for the signal generating coil. This magnetic material is so arranged as to apply a practical maximum of magnetic flux to the coil with a practical minimum of weight. Thus, both an inner, cylindrically shaped pole piece that extends upwardly into the coil and an outer, ring-shaped pole piece that extends upwardly around the outside of the coil, are substantially comprised of highly efficient and effective permanent magnetic material. Alnico is an example of such material.

A still further advantage is attained in the construction of a device of this invention by suspending the mass and the moving coil on relatively fragile springs and providing a stop member that prevents both excessive up and down movement and excessive lateral movement of the mass and coil, thus preventing the possibility of injury to the springs by dropping or other rough treatment of the device. The device is also encased in a light, but rugged, housing that further prevents possible damage to the device in field use.

In the course of present day seismic prospecting, it often becomes necessary to carry seismometers relatively long distances by hand, for in many of the places where seismic prospecting must be accomplished the terrain is rough or swampy or otherwise inaccessible to motor vehicles. When it is considered that as many as fifty to one hundred seismometers are often used in a single spread, that is, for a single seismic operation, it will be apparent that the problem of transporting seismometers to their location over bad terrain is considerable. Thus, it is quite important that very light, and yet very efficient and very sensitive, seismometers be available. It is the purpose of this invention to provide such seismometers.

Another object of this invention is to provide for critically damped or "dead-beat" operation of such seismometers, simply and efficiently.

Further advantages and details of the seismometer of this invention will be apparent from the following detailed description of the preferred embodiment thereof, together with the drawings to which this description refers.

Figure 1:
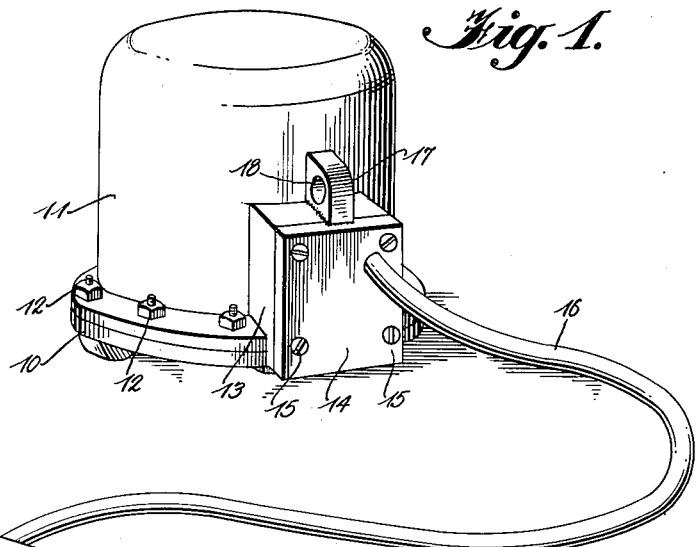
Figure 1 is a perspective view of a complete seismometer together with its connecting cable and attaching clip.
Figure 2:
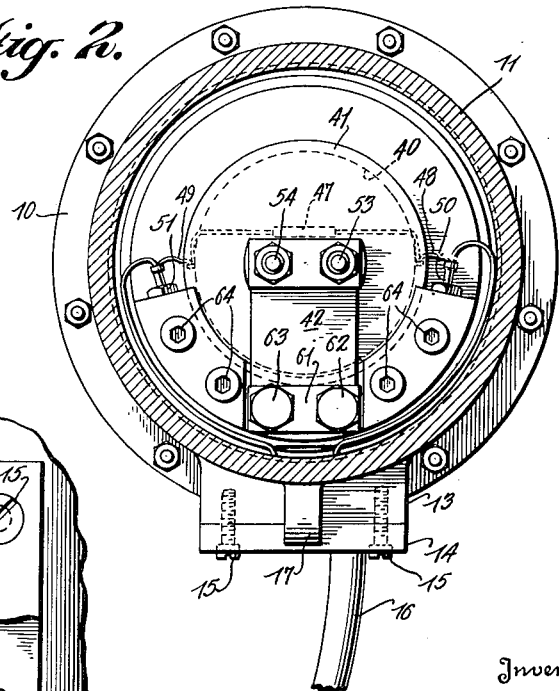
Figure 2 is a plan view of the seismometer as shown in Figure 1 with the outer case sectioned to show the inner mechanism. This view is taken on the line 2—2 of Figure 5.
Figure 3:
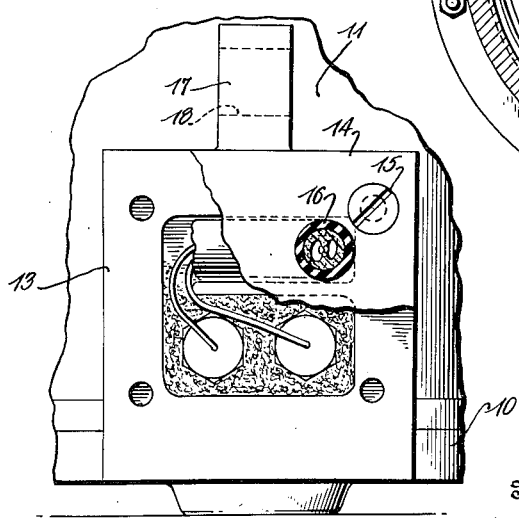
Figure 3 is a detail view of a part of the seismometer shown in Figure 1 from which the connecting cable emerges. In this view a part of the cover plate has been cut away to show the connection.

The seismometer illustrated in the drawings is only about four inches in diameter and weighs less than four pounds. As illustrated in Figure 1, it is entirely enclosed within a base plate 10 and a cap or cover plate 11 which is bolted to the base plate by a series of machine screws and nuts 12. Rivets may be substituted for the machine screws and nuts 12, if desired. Formed within the cover plate 11 is a small sealing compartment 13 enclosed by a secondary cover plate 14 attached to it with machine screws 15. This compartment is for the purpose of receiving electrical leads from the seismometer and connecting them to an outgoing cable 16 and is adapted to be filled with a sealing material so that moisture cannot enter and cause leakage between the seismometer connections. A lug 17 may also be provided on the cover 11 and a hole 18 formed in this lug to provide for the attaching of a small rope or any other desired form of handle. Cable 16 will normally terminate in a clip-type of connector such as is shown at 19 in Figure 1.

Figure 4:
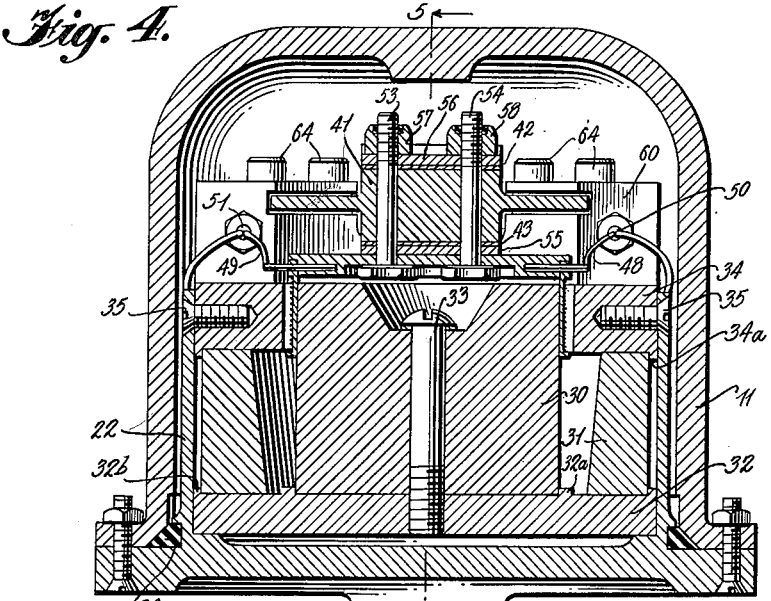
Figure 4 is a sectional elevational view of the seismometer shown in Figure 1. This view is taken on the line 4—4 of Figure 5.
Figure 5:
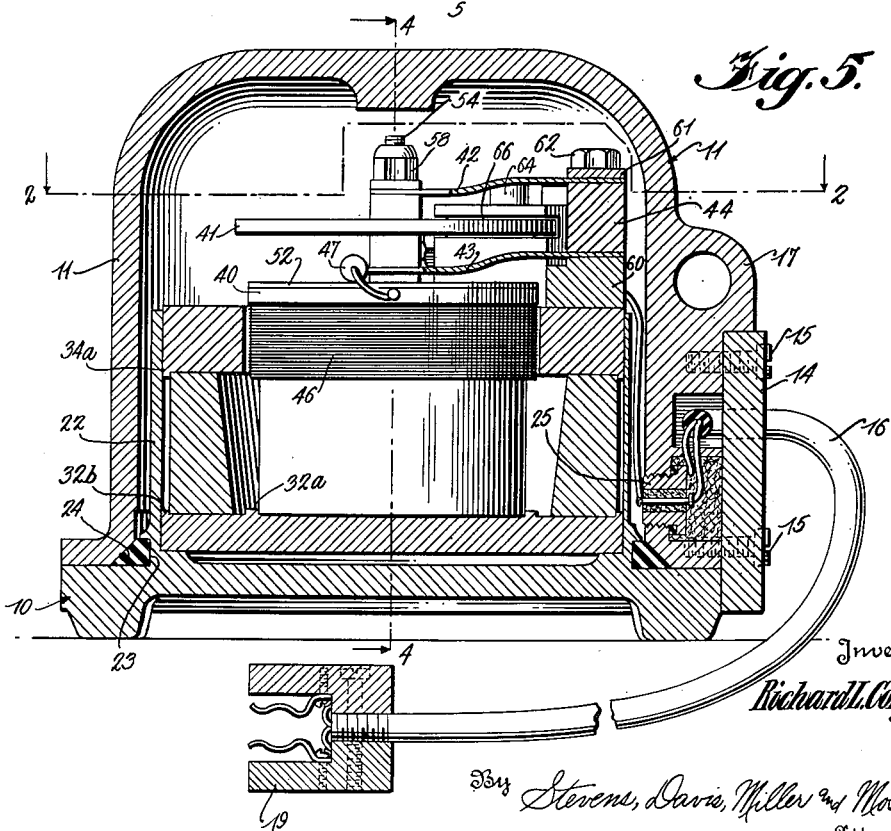
Figure 5 is another sectional elevational view of the seismometer shown in Figure 1, this view being taken on the line 5—5 of Figure 4.

The base plate 10, as shown in Figures 4 and 5, includes a cup-shaped upwardly extending flange 22 for receiving the seismometer mechanism and supporting it in the desired position inside of the case. The base plate 10 is also formed with a peripheral groove 23 at the bottom of the cup-shaped flange for receiving a sealing ring or washer 24. The cover plate 11, when fastened into place, presses tightly against this sealing ring to seal the seismometer compartment tightly against the entrance of moisture or the like. The cover plate 11, inside of the small sealing compartment through which the electrical connections pass, is drilled and tapped to receive two hermetically-sealed nipples 25 through which connecting wires may pass from the seismometer into the sealing compartment. These wires are sealed hermetically in the nipples and the sealing compartment is also packed with an insulating and sealing material. As a result the wires are both insulated from each other and from the case and the entrance of moisture or dirt into the seismometer compartment is entirely prevented. The nipples are of the type in which a bare wire passes through a glass bead sealed in the nipple.

The magnetic field for the seismometer is provided by two permanent magnets of high strength. One of these is a cylindrically shaped magnet 30 and this magnet acts also as the inner pole face for the floating coil. The other permanent magnet is a ring-shaped permanent magnet 31, also of high strength, and this ring-shaped magnet 31 is positioned so that it surrounds the inner cylindrical magnet 30.

Across the bases of the two permanent magnets 30 and 31 is a base plate 32, usually of soft iron so as to form a low reluctance path for the magnetic flux. The center cylindrical magnet 30 is bolted to this pole piece by a machine screw 33 which passes downwardly through the center of the cylindrical magnet and screws into the base plate 32. On top of the ring-shaped magnet 31 is mounted a pole piece 34 which is also ring-shaped and usually of soft iron so as to form a low reluctance magnetic path. The inner surface of this ring-shaped pole piece 34 is so shaped and so placed that it lies relatively closely adjacent the outer surface of the upper end of the cylindrical magnet 30, thus forming a short annular air gap in which the moving coil may be placed.

As can be seen in Figures 4 and 5, the base plate is formed with two carefully placed positioning ridges 32a and 32b, which serve to establish, very accurately, the positions of the inner and outer magnets 30 and 31. These ridges are important because they aid materially in the rapid, easy assembly of the device, and provide for an accurate, symmetrical air-gap. They also prevent the magnets and hence the air-gap from becoming misaligned by rough treatment. The ring-shaped pole piece 34 is also formed with a ridge 34a, which cooperates with the outer magnet 31, for the same purposes.

In assembling a seismometer of the type herein described, the cylindrical magnet and the ring-shaped outer magnet may first be assembled on the base plate 32, the ring-shaped pole piece placed thereon, and the whole assembly lowered into the cup-shaped flange 22 on the base plate. This assembly may then be fastened in the cup-shaped flange 22 by means of a series of countersunk machine screws 35 which pass through the cup-shaped flange 22 and into the ring-shaped pole piece 34.

The mass and coil assembly may be mounted on the magnetic assembly either before or after it is fastened in the base plate. This assembly consists of a cylindrical coil form 40 rigidly connected to a disc-shaped mass 41 and both supported by leaf springs 42 and 43 from supporting members 44 and 60 which act both to support the coil form and mass and also to limit their movement so as to protect the leaf springs from injury.

On the coil form 40 is wound a coil of relatively fine wire 46 and between the ends of this wire 46 is connected the resistor 47 having a resistance of around 120 ohms when the coil has a resistance of about 72 ohms. This resistance permits enough current to flow through the coil, when the coil is moved, so that the coil will absorb a sufficient amount of energy to prevent its continued oscillation. Thus, a critically damped or "dead-beat" action of the coil and mass is provided, very simply and very efficiently. Current from the coil 46 is also carried to the output cable through small flexible wires 48 and 49. These wires are fastened to insulators 50 and 51 mounted on the lower supporting member 60 so that there will be no appreciable variation in tension or weight placed on the moving coil and mass. From the insulators 50 and 51 the connecting wires may be somewhat heavier and more heavily insulated. They will extend into the sealing compartment, there to be connected with the output cable.

At its upper end the coil form 40 is attached to a circular plate 52 which is in turn supported by a pair of bolts 53 and 54 which pass upwardly through a separating washer 55, the end of one of the supporting springs 43, the mass 41, the end of the other supporting spring 42, a washer 56 and securing nuts 57 and 58. Supporting springs 42 and 43 are then clamped between the lower supporting member 60, the upper supporting member 44, and a washer 61. This is accomplished by the use of two bolts 62 and 63 that extend downwardly through the washer 61, the upper supporting spring 42, the upper supporting member 44, the lower supporting spring 43 and into the lower supporting member 60, the lower supporting member 60 being tapped to receive them. The lower supporting member 60 is then fastened to the ring-shaped pole piece 34 by a series of cap screws 64.

The lower supporting member 60 is arcuate in shape when viewed from above and extends approximately 150° around the periphery of the disc-shaped mass 41. In its inner face is cut a groove 66 which surrounds the edge of the disc-shaped mass 41 and acts as a stop to prevent excessive movement of the disc-shaped mass both vertically and horizontally. Obviously, it does not prevent horizontal movement of the mass in a direction away from the spring anchorages but the springs will withstand any tension thus applied. It does, however, prevent the springs from being subjected to excessive compressional or side or bending stresses and these are the stresses that could easily damage the relatively light springs.

In assembling the seismometer of this invention, the arcuate supporting member 60 may have assembled thereon the springs 42 and 43, the upper supporting member 44, the mass 41 and the coil form 40, together with all of the necessary windings and wiring. This entire unit may then be mounted on the field magnet structure by means of the cap screws 64 and this mounting adjusted so as to adjust the coil form to the proper position in the air-gap. As a result this subassembly can be mounted onto the field magnet assembly and completely adjusted by one centering operation after all of the other pieces have been put together. Little or no precise control aside from the accurate dimensioning of the parts is necessary. This is a very important consideration and contributes materially to the substantial lessening of the cost of the device.

I claim:

1. A seismometer that comprises a base member having an upstanding cup-shaped flange thereon, a circular, low reluctance plate seated in said base member within said flange, a cylindrical high strength permanent magnet bolted to the center of said plate and extending upwardly therefrom, a ring-shaped high strength permanent magnet positioned on said plate around said cylindrical magnet and spaced therefrom within said flange, a ring-shaped pole piece mounted on top of said ring-shaped magnet within said flange and with its inner surface spaced from the outer surface of said cylindrical magnet to form a high flux density air-gap therebetween, means for securing said ring-shaped pole piece within said flange, a cylindrical coil form adapted to be positioned in and be for movement in said air-gap, a disc-shaped mass adapted to be positioned above said coil form, means for fastening said coil form and disc-shaped mass together, two leaf springs attached to and supporting said disc-shaped mass and coil form, means for supporting said leaf springs, said means including an arcuate member extending approximately 150° horizontally around said disc-shaped mass and including a groove overlying the edge of said disc-shaped mass to limit the movement of said disc-shaped mass both vertically and horizontally, means for attaching said supporting means to the ring-shaped pole piece, a coil of conductive material on said coil form, means for connecting said coil of conductive material to a point outside of said seismometer, and a cover member shaped to fit tightly against said base member and completely cover the working parts of the seismometer.

2. In a seismometer that includes a movable coil and a fixed magnet, the improvement that comprises means to support the coil comprising two leaf springs one end of each of which is fixed to the coil and the other end of each of which is fixed to a stationary part of the seismometer, the points of attachment of these springs to the coil being spaced in the direction of the axis of the coil and the points of attachment of the springs to a stationary part being similarly spaced so that the coil is maintained against tilting, and means to prevent injury to the mechanism by mechanical shock that comprises a disc axially aligned with the coil and fixed to the coil near the suspending springs and a grooved arcuate member surrounding a substantial portion of the edge of said disc on the side nearest the stationary ends of the springs, said arcuate member being fixed to a stationary part of the seismometer and serving to limit the motion of the coil and protect the springs against excessive compressive and bending forces.

RICHARD L. CONGDON.

REFERENCES CITED

The following references are of record in the file of this patent:

UNITED STATES PATENTS

| Number | Name | Date |
|---|---|---|
| 1,875,004 | Horsburgh et al. | Aug. 30, 1932 |
| 2,048,222 | Rehmann | July 21, 1936 |
| 2,067,636 | Heiland | Jan. 12, 1937 |
| 2,130,213 | Wolf | Sept. 13, 1938 |
| 2,271,864 | Honnell | Feb. 3, 1942 |
| 2,417,077 | Hoover | Mar. 11, 1947 |
| 2,487,029 | Piety | Nov. 1, 1949 |
| 2,490,595 | Merten | Dec. 6, 1949 |

FOREIGN PATENTS

| Number | Country | Date |
|---|---|---|
| 488,875 | Great Britain | July 15, 1938 |
| 595,739 | Great Britain | Dec. 15, 1947 |